United States Patent [19]
Fuse et al.

[11] Patent Number: 5,321,939
[45] Date of Patent: Jun. 21, 1994

[54] DETECTOR OF GRASS-BAG FULLNESS FOR MOWER

[75] Inventors: Shinya Fuse; Tadashi Shimada; Akio Noji; Naoki Kinoshita; Toshikazu Nakamura; Hironori Kato, all of Saitama, Japan

[73] Assignee: Honda Giken Kogyo Kabushiki Kaisha, Tokyo, Japan

[21] Appl. No.: 950,291

[22] Filed: Sep. 24, 1992

[30] Foreign Application Priority Data

Sep. 25, 1991 [JP] Japan .................................... 271896

[51] Int. Cl.⁵ ........................................... A01D 75/28
[52] U.S. Cl. ..................................... 56/10.2; 56/10.5; 56/16.6; 56/202; 56/DIG. 15
[58] Field of Search ................ 56/10.2, 10.5, DIG. 15, 56/202, 16.6

[56] References Cited

U.S. PATENT DOCUMENTS

| 4,228,636 | 10/1980 | Homburg | 56/10.2 R |
| 4,723,398 | 2/1988 | Flenniker et al. | 56/202 X |
| 4,926,624 | 5/1990 | Murakawa et al. | 56/202 |
| 4,964,266 | 10/1990 | Kolb | 56/202 |
| 4,981,011 | 1/1991 | Olejak | 56/10.2 |

FOREIGN PATENT DOCUMENTS

| 2135480 | 4/1972 | Fed. Rep. of Germany . |
| 2251210 | 4/1973 | Fed. Rep. of Germany . |
| 2258611 | 6/1973 | Fed. Rep. of Germany . |
| 2200878 | 8/1973 | Fed. Rep. of Germany . |
| 2549317 | 5/1977 | Fed. Rep. of Germany . |
| 3240048 | 5/1984 | Fed. Rep. of Germany . |
| 3821221 | 11/1988 | Fed. Rep. of Germany . |
| 3814119 | 6/1990 | Fed. Rep. of Germany . |
| 8403413 | 9/1984 | PCT Int'l Appl. . |
| 635398 | 11/1978 | U.S.S.R. . |
| 966638 | 10/1982 | U.S.S.R. . |
| 1242515 | 8/1971 | United Kingdom . |

Primary Examiner—Timothy V. Eley
Attorney, Agent, or Firm—Pollock, Vande Sande and Priddy

[57] ABSTRACT

A transmission type light sensor is disposed in the vicinity of the exit of a shooter, which has the exit thereof positioned above a grass-bag opening, and the fullness of the grass-bag is detected when the light blocking state of the sensor continues longer than a predetermined time. A light emitting portion and a light receiving portion of the light sensor are positioned opposite to each other so that their optical axes are in coincidence, and they are firmly attached to both ends of a light sensor mounting member. The light sensor consists of a light sensor main body which is placed at one side of a cover, and a retroreflective board placed at the side of the cover opposite to the light sensor main body for reflecting incident light from the light emitting portion in the direction of incidence.

13 Claims, 8 Drawing Sheets

DETECTOR OF GRASS-BAG FULLNESS FOR MOWER

BACKGROUND OF THE INVENTION

1. Field of the Invention

The present invention is related to a detector of grass-bag fullness for a mower, and particularly to a detector of grass-bag fullness for a mower which can accurately detect fullness independently of the properties (dry or wet, length, thickness, etc.) of the grass being mown.

2. Description of the Prior Art

A mower for lawn, weeds and the like (hereinafter referred to as grass) has a cutter blade for cutting grass on the underside of it. The mown grass is conveyed within a duct-like shooter by an air flow due to rotation of the cutter blade, and is received in a container or grass-bag for collecting grass. In the prior art, grass-bag fullness is detected by a sensor provided in the grass-bag, and the worker is informed of that by means of an alarm such as a buzzer.

An example of the conventional, typical detector for detecting the amount of grass in the grass-bag will be described with reference to FIGS. 8A, 8B, 9A and 9B. Grass-bag 11 consists of cover 12 and two container portions, namely, a first bag 11a and a second bag 11b. The grass mown by a cutter blade, not shown, is conveyed within shooter 13 and accumulated in the first and second bags 11a and 11b.

Figure 8A:
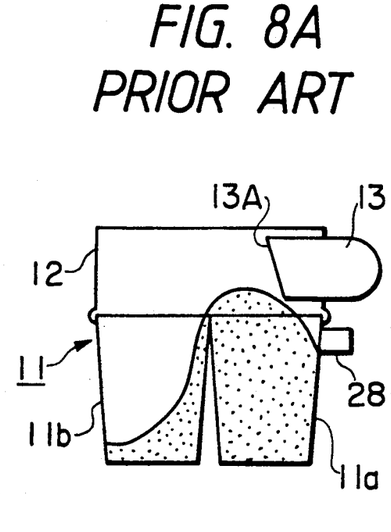
FIGS. 8A and 8B are diagrams showing an example of a conventional detector.
Figure 8B:
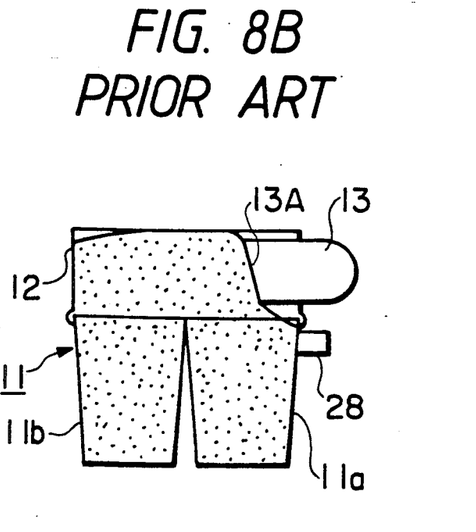

In FIGS. 8A and 8B, a level sensor 28 is provided on the grass-bag in an upper portion, under the discharge opening 13A of shooter 13. The level sensor 28 detects when the height level of the grass accumulated in grass-bag 11 has reached a predetermined value, thereby detecting that the grass-bag 11 is full. Such an apparatus is described, for instance, in the Japanese Kokai Utility Model 63-148125 official gazette.

Figure 9A:
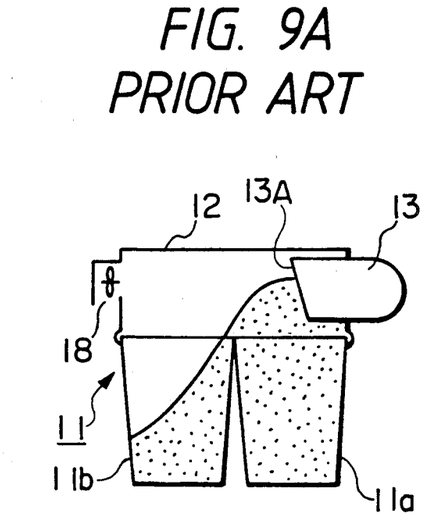
FIGS. 9A and 9B are diagrams showing another example of the conventional detector.
Figure 9B:
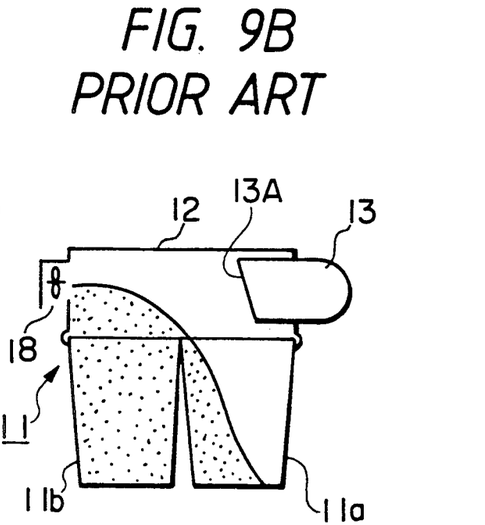

On the other hand, in the detector shown in FIGS. 9A and 9B, a flow rate sensor 18 is provided in cover 12. Flow rate sensor 18 measures the flow rate of air discharged from grass-bag 11, and the amount of the grass accumulated in grass-bag 11 is determined by the measured air flow rate. Such an apparatus is described, for instance, in the Japanese Kokai Patent 63-24814 official gazette.

The above prior art had the following problems. Since mown grass does not evenly accumulates in the first and second bags 11a and 11b of the grass-bag 11, it is very difficult to accurately detect that the grass-bag is full of mown grass, by use of such sensors 18 and 28.

For instance, if the grass to be mown is wet or its length to be cut is long, the mown grass tends to be first accumulated in the first bag 11a as shown by the shaded portions in FIGS. 8A and 8B. When the method of judging fullness of the bag 11 detects the height level of the accumulated grass, there is a tendency for only first bag 11a to become full before second bag 11b is full, so that fullness of grass-bag 11 may be detected in error (FIG. 8A). Also, when the method of detecting fullness relies on air flow rate, the exit 13A of shooter 13 may jam before second bag 11b becomes full, and furthermore, even fullness detection for preventing a jam cannot be performed (FIG. 9A).

To the contrary, if the grass is dry and sparse, the second bag 11b tends to be accumulated first (FIGS. 8B, 9B). For this, in the method of judging fullness by the height level of the grass, the grass may excessively accumulate and fullness may be detected after the grass begins to jam in the shooter exit 13A (FIG. 8B). On the other hand, in the method of detecting fullness by air flow rate, grass-bag 11 may be misjudged to be full, because the amount of the discharged air decreases before first bag 11a becomes full (FIG. 9B).

If shooter exit 13A has jammed or the grass has excessively accumulated in grass-bag 11, the post-treatment for cleaning of shooter 13 or removal of the grass becomes cumbersome. In addition, if the timing of fullness judgment is too early, more frequent disposal work is needed, which makes the moving operation inefficient.

In order to avoid such inconveniences, the detection sensitivity and set position of the sensor must be adjusted according to the degree of dry or wet, length of the grass to be mown or the work condition. However, it is impossible in fact to optimally perform such adjustment according to the properties of the grass to be mown.

SUMMARY OF THE INVENTION

It is the object of the present invention to avoid the above problems of the prior art by providing a detector of grass-bag fullness which can accurately detect fullness of the grass-bag without being affected by the grass properties or condition, work condition and the like.

The present invention is characterized in that a transmission type light sensor is disposed in the vicinity of the exit of a shooter whose exit is positioned above the grass-bag opening, and fullness of the grass-bag is detected when the light blocking state of the sensor continues longer than a predetermined time.

In the present invention, light emitted from the transmission type light sensor provided in the vicinity of the exit of the shooter is blocked by the grass discharged from the shooter exit to the grass-bag and/or by the grass which is whirled up by the air blown out from the shooter after having temporarily accumulated in the grass-bag. If the light blocking state is a preset state and continues longer than a predetermined time, it can be judged that the grass-bag is (nearly) full.

DETAILED DESCRIPTION OF THE PREFERRED EMBODIMENT

An embodiment of the present invention is described with reference lo the drawings. In this embodiment, the description is made with reference to a manned lawn mower as an example of the mower to which the detector of the present invention is applied, but it would be obvious that the present invention can be applied to other types of mowers.

Figure 3:
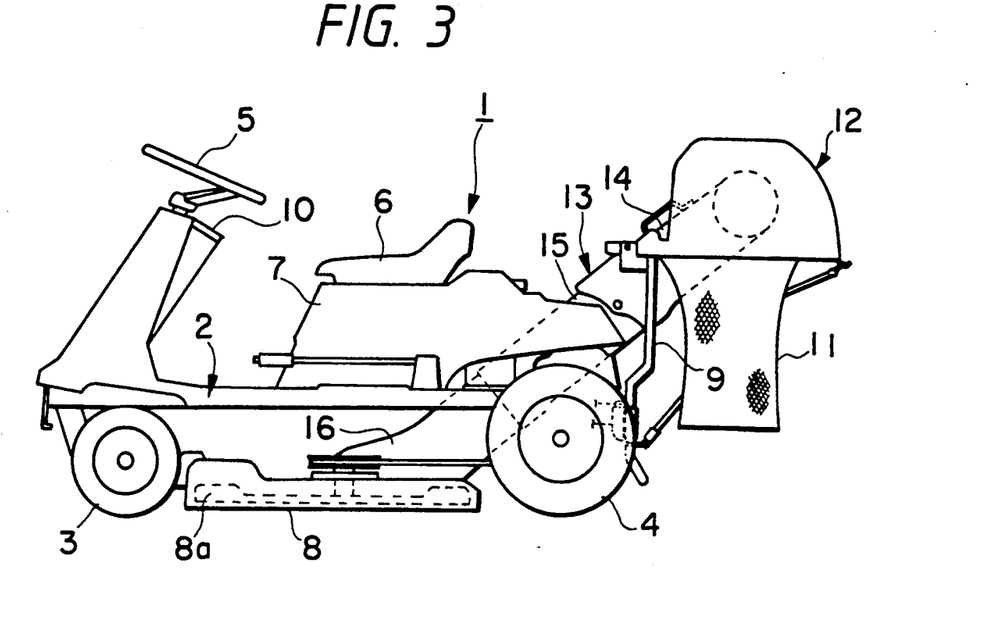
FIG. 3 is a side view of the manned lawn mower.
Figure 4:
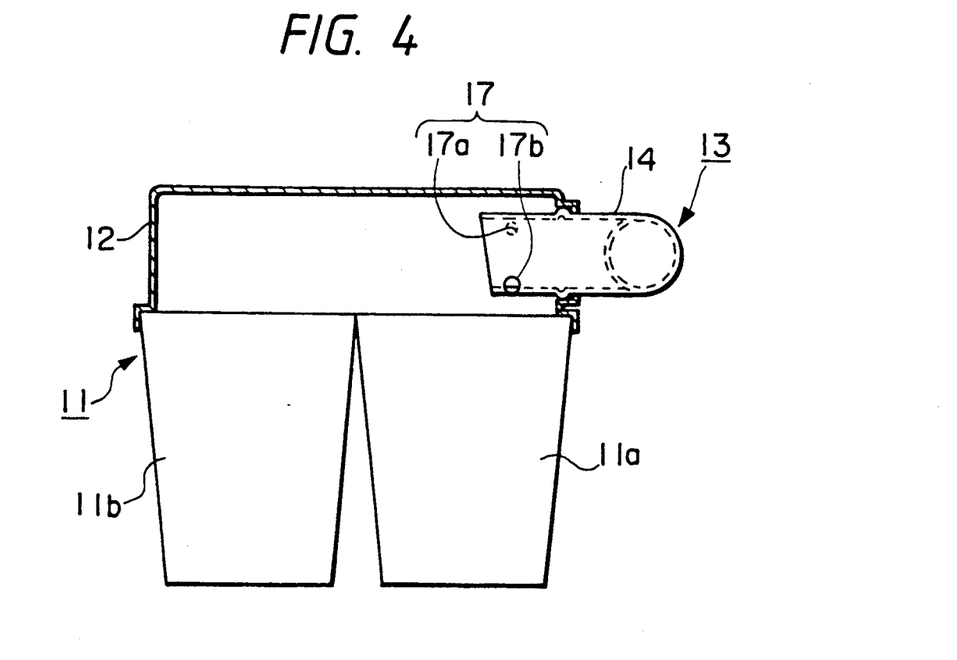
FIG. 4 is a partial sectional view of the grass-bag portion of the sulky type lawn mower shown in FIG. 3.

FIG. 3 is a side view of the mower to which the present invention is preferably applied, and FIG. 4 is a sectional view of the grass-bag portion equipped on the mower. In these figures, the mower is provided with front wheels 3 for steering control in the front part of the body 2, and rear wheels 4 serving as a driving wheel in the rear part of the body 2. The front wheels are steered by a steering wheel or handle 5 provided in the front of body 2. Provided in the center of body 2 is seat 6, under which an engine (not shown) covered with a cover 7 is mounted.

Cutter housing 8 receiving a cutter blade 8a is disposed under body 2. Supporting stay 9 is provided in the rear part of the body 2, and a grass-bag 11 is removably mounted on a supporting frame (not shown), which is horizontally attached to the stay 9. As seen from FIG. 4, grass-bag 11 consists of first bag 11a and second bag 11b, and the upper openings of the first and second bags 11a and 11b are covered by cover 12 which can freely be opened and closed. Control panel 10 is provided below the steering wheel 5 in front of seat B. On the control panel 10, a lamp and buzzer for alarming fullness of grass-bag 11 are placed in addition to necessary electronic control circuits.

Shooter 13 shaped as a duct is provided between the cutter housing 8 and bag 11, and grass mowed by cutter blade 8a is conveyed by air within the shooter 13 and received in grass-bag 11. Shooter 13 consists of upper cylinder body 14, intermediate cylinder body 15 and lower cylinder body 16 (FIG. 3) so that it is easily assembled and disassembled for maintenance and cleaning.

In the upper cylinder body 14 of shooter 13, a light sensor 17 consisting of a light emitting portion 17a and a flight receiving portion 17b is provided for detecting fullness of grass-bag 11. An example of the mounting state of the light sensor is described with reference to the perspective view in FIG. 5. Light emitting portion 17a and light receiving portion 17b mounted on the inner surface of the upper cylinder body 14 are positioned so that the respective light emitting surface and light receiving surface are inwardly opposed to each other. As light emitting portion 17a, a light emitting diode can be used for instance, and a photo IC including a photo diode can be used as light receiving portion 17b.

Figure 5:
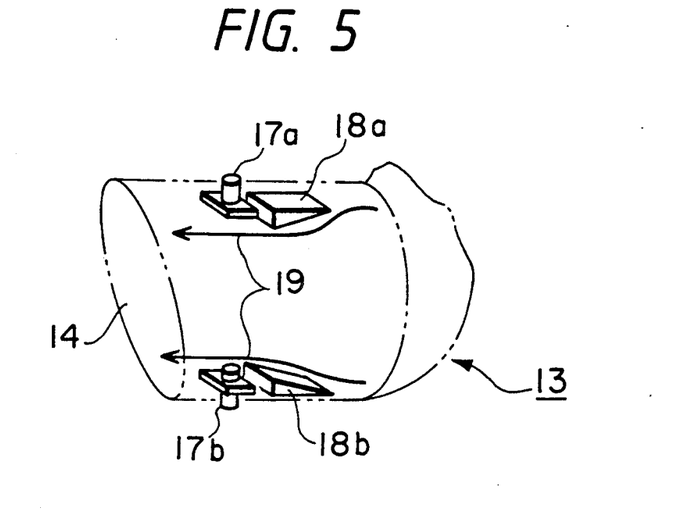
FIG. 5 is a perspective view of a discharge opening section of the shooter and a light sensor disposed thereon.

Upstream of the light emitting portion 17a and light receiving portion 17b with respect to the direction of air flow, sensor guards 18a and 18b for controlling the air flow are preferably fixed so that the grass flowing in shooter 13 does not contact with or stick to light sensor 17. Sensor guards 18a and 18b cause the flowing air to avoid light emitting portion 17a and light receiving portion 17b as shown by arrows 19.

Figure 6:
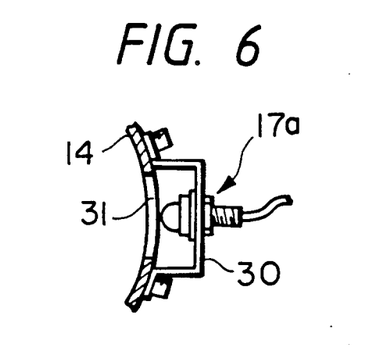
FIG. 6 is a sectional view showing another mounting style of the light sensor.

To protect light sensor 17 from grass and dust, light sensor 17 may be placed outside the shooter 13 as shown in FIG. 6, which is a sectional view showing the construction of the light emitting portion 17a side. A recess is formed by bracket 30 externally of a window opened in the wall of upper cylinder body 14, and light emitting portion 17a is received therein. At the window, or the boundary portion between bracket 30 and upper cylinder body 14, transparent member 31 such as an acrylic board may be disposed as a partition board. The light receiving portion 17b side can also be formed in a manner similar to the light emitting portion 17a.

Now, the controller of this embodiment is described with reference to the block diagram of FIG. 1. Light sensor 17 outputs a pulse signal which has been shaped according to the predetermined threshold value of the light received by the light sensor 17. That is, if the level of light received by receiving portion 17b is lower than the threshold value, light sensor 17 outputs a high (H) level signal which indicates that it is in a light blocking state, while if the level of received light is higher than the threshold value, light sensor 17 outputs a low (L) level signal which indicates that it is in a light reception state.

The output pulse of light sensor 17 is input to control section 20. A signal continuity detector circuit 21 of control section 20 detects whether or not the high-level output signal of the light sensor 17 has continued for a predetermined time. If the high (H) level output signal has continued for at least the predetermined time, an output signal is supplied from signal continuity detector circuit 21 to lamp driver circuit 22 to light lamp 23. Simultaneously, buzzer driver circuit 25 is also activated through timer circuit 24 to sound buzzer 26. Timer circuit 24 starts to clock time with the beginning of sounding of buzzer 26, and outputs a signal to stop the driving of buzzer driver circuit 25 when a predetermined time has elapsed, for stopping the buzzer 26.

The output signal of light sensor 17 supplied to the control section 20 may be process as follows. That is, the proportion of the time that the output level of the light sensor is high (H) during a predetermined calculation period or time is calculated, and if the proportion or light blocking ratio is greater than a predetermined value, a high (H) signal is supplied to lamp driver circuit 22 and buzzer driver circuit 25. The calculation of the light blocking ratio and the comparative calculation of the light blocking ratio with the threshold value can be performed by a micro-computer. For instance, the light blocking ratio is obtained by sampling the output of light sensor 17 with a predetermined period and counting the number of H-level samples a predetermined time duration.

Figure 1:
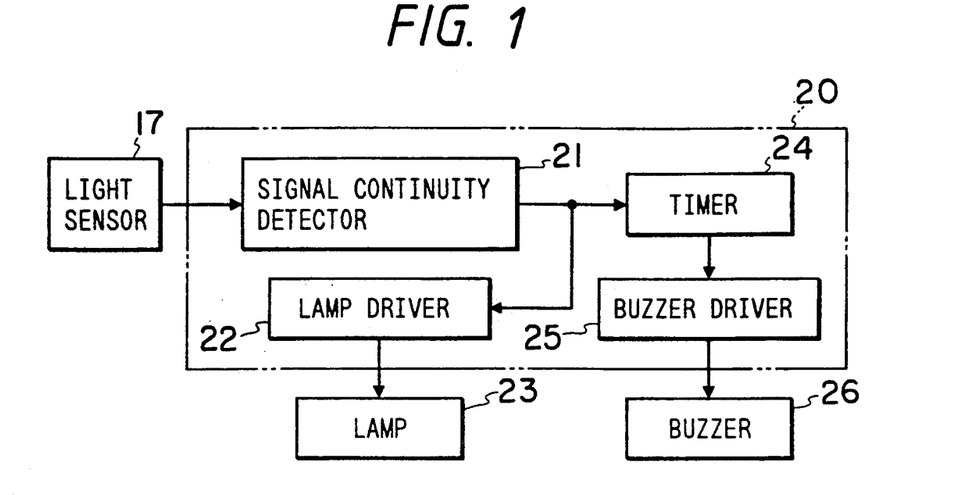
FIG. 1 is a block diagram showing the principal construction of the controller for a grass-bag fullness detector according to the present invention.
Figure 2:
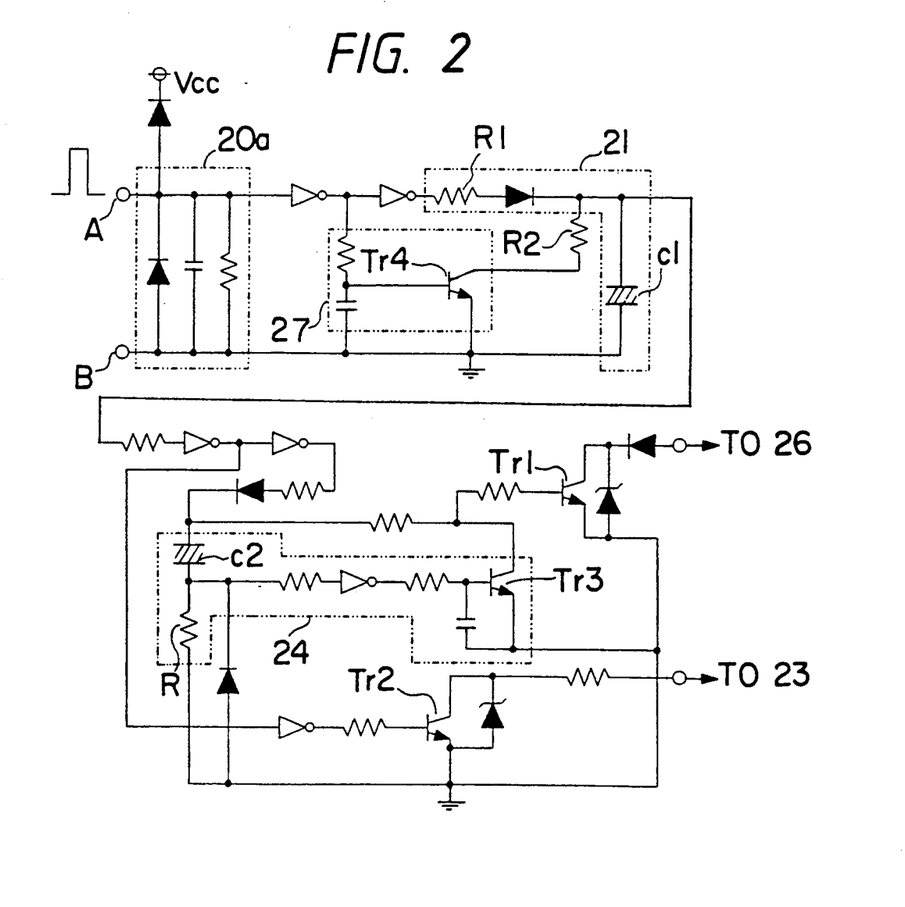
FIG. 2 is a specific circuit diagram of the control section.

A specific circuit diagram of the control section 20 is shown in FIG. 2 where the same symbols as FIG. 1 represent the same or identical portions. A pulse signal corresponding to the light blocking state of light sensor 17 is applied between input terminals A and B. In noise removing circuit 20a, the noise (particularly, high-frequency noise) of the input signal is removed. A capacitor C1 of the signal continuity detector circuit 21, which is a kind of a time constant circuit, is charged by the output of the circuit 20a through resistor R1 and a forward diode, and if the pulse signal is held at a high potential (H) until the terminal voltage of capacitor C1 rises to a predetermined value, transistors Tr1 and Tr2 turn on to activate buzzer 26 and lamp 23.

In timer circuit 24, transistor Tr3 turns on when a time determined by the capacity of capacitor C2 and the value of resistor R has elapsed, whereby transistor Tr1 is turned off to stop activation of buzzer 26.

In a reset circuit 27, when the output signal from light sensor 17 becomes a low potential (in case of light detection), transistor Tr4 turns on, and as a result, the capacitor C1 is discharged via resistor R2, so that the signal continuity detector circuit 21 is reset and the continuation time of signal is clocked again from the beginning. The reset circuit 27 resets signal continuity detector circuit 21 when the input signal from light sensor 17 has become "L" level even once before the terminal voltage of capacitor C1 rises to the predetermined value, which eliminates activation of buzzer 26 or lamp 23 by incorrect detection, and thus fullness of grass-bag 11 can be detected more accurately even if the quantity or density of the mown grass being conveyed in the shooter 13 temporarily increases.

Figure 7:
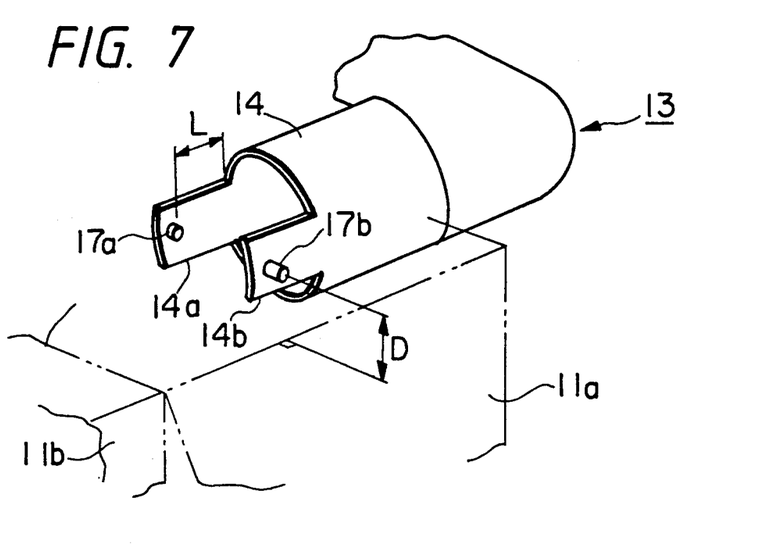
FIG. 7 is a perspective view showing still another mounting style of the light sensor.

Now, another example of the mounting position of the light sensor 17 will be described with reference to FIG. 7. Ay As seen in that figure, projections 14a and 14b are provided at opposed positions in the front opening end of upper cylinder body 14 of shooter 13. The light emitting portion 17a is fixed to projection 14a, and the light receiving portion 17b is fixed to projection 14b so that they are opposed to each other. The distance L from the front opening end of upper cylinder body 14 to the sensor 17 (17a and 17b), and the distance D from the top opening end of first and second bags 11a and 11b to the sensor 17 are determined in consideration of the quantity of the grass to pass through the shooter 13 and the amount of the grass whirled up by the air flow which is blown out from the upper cylinder body 14. It may also be possible to provide a window and recess in each of the projections, and to mount the light emitting portion and/or light receiving portion in the recess, as shown in FIG. 6.

Although the light sensor 17 is integrally supported on the shooter 13 in this embodiment, other appropriate mounting positions or manners can be chosen according to the shapes and constructions of shooter 13, cover 12, and first and second grass-bags 11a and 11b, and also in consideration of the disposal process of the grass accumulated in the bags. In brief, it is only needed to dispose the light sensor 17 in a position which is in the vicinity of the exit opening of shooter 13 and enables fullness of grass-bag 11 to be detected, on the basis of the whirling-up state of the temporarily accumulated grass and the passage state (degree of jam) of the grass discharged from the exit opening of shooter 13. The optical axis connecting the light receiving portion and the light emitting portion may be vertical as in FIGS. 4 and 5 or horizontal as in FIG. 7, or inclined intermediately of them. The construction of FIG. 7 is advantageous in that not only the transient state of mown grass accumulation but also the amount of mown grass having been actually accumulated in the bag can directly be detected.

Figure 10:
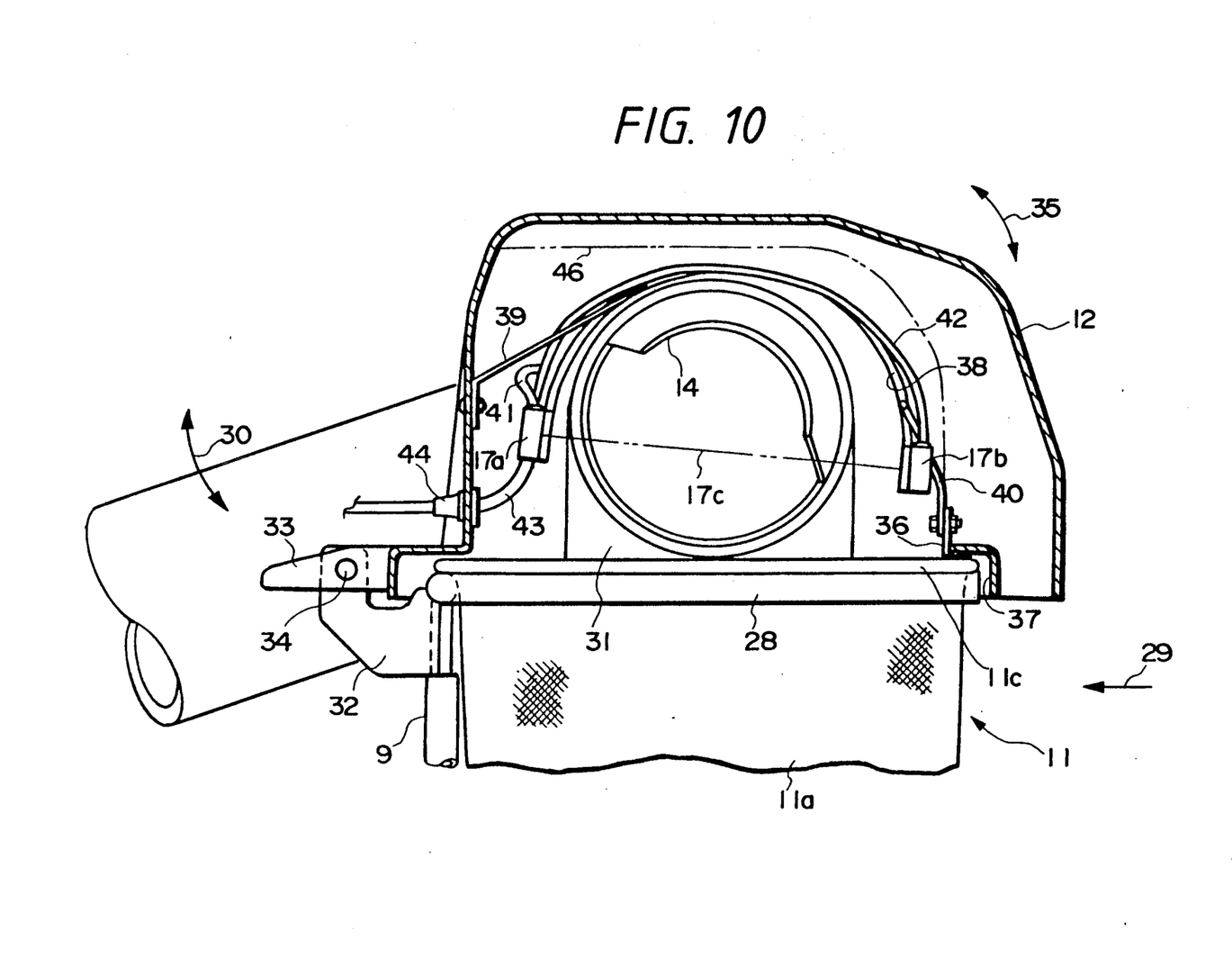
FIG. 10 is a sectional view of the main part of the grass-bag of the lawn mower.
Figure 11:
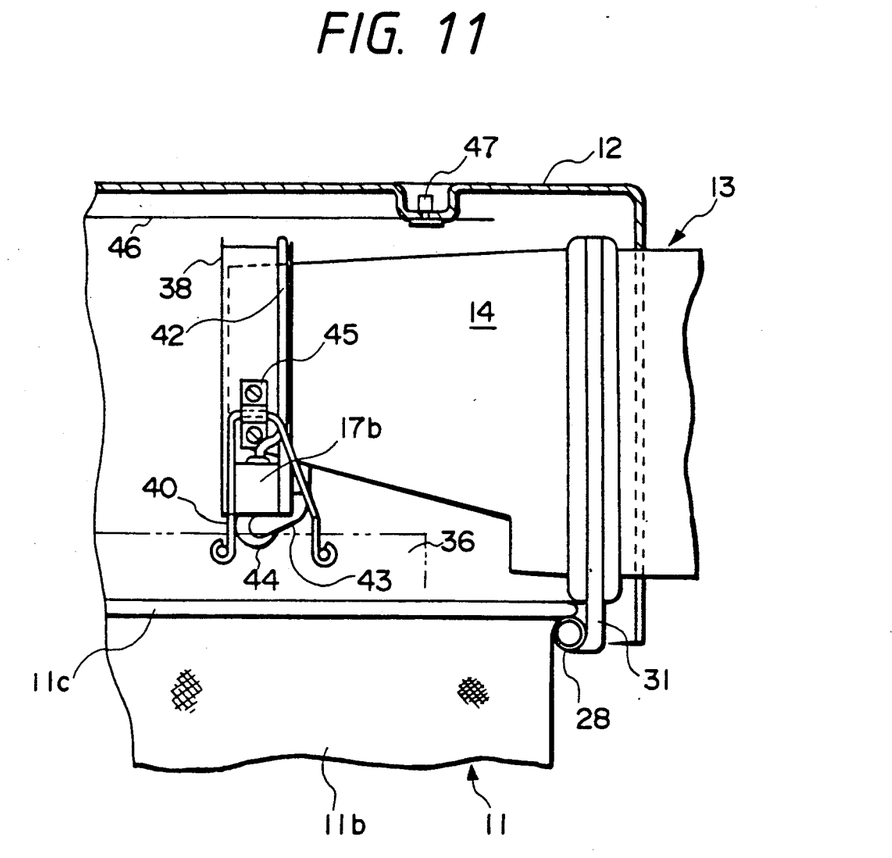
FIG. 11 is a partially sectional side view.
Figure 12:
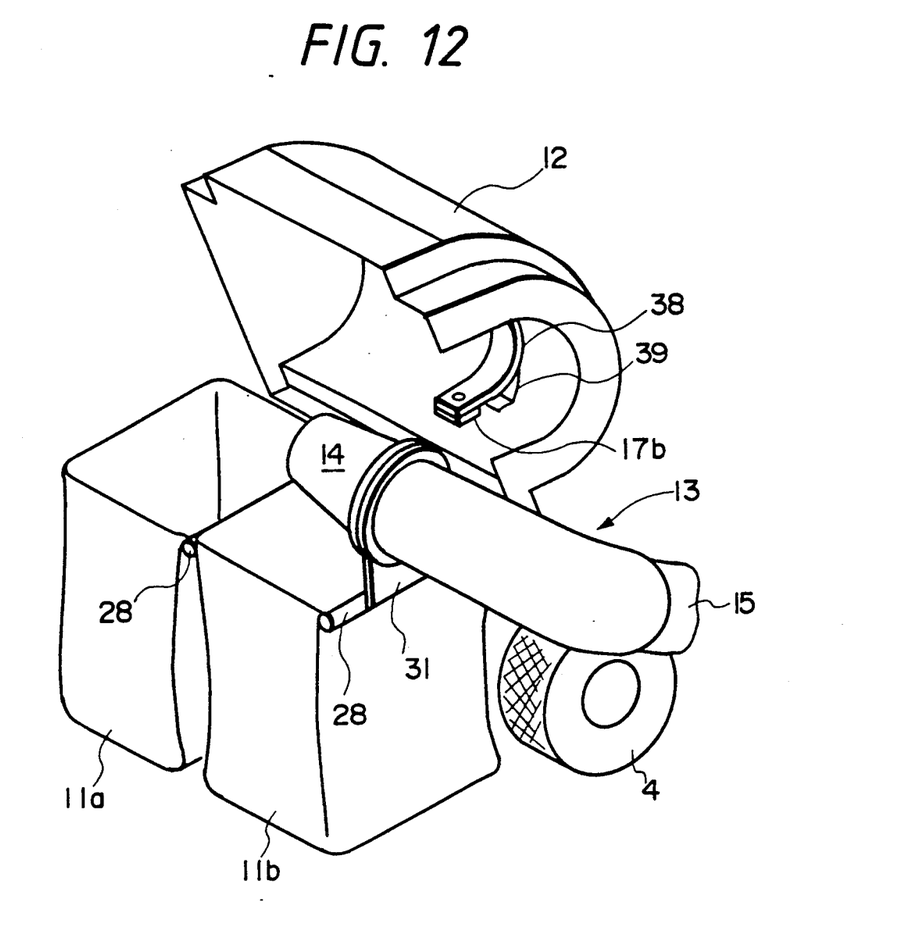
FIG. 12 is a perspective view showing a state in which the cover 12 is opened.

With reference to FIGS. 10 to 12, a description is made of a further mounting structure example in which the light sensor is attached to the cover. FIG. 10 is a sectional view of the main part of the grass-bag of the lawn mower, FIG. 11 is a partially sectional side view, and FIG. 12 is a perspective view showing a state in which the cover 12 is opened. In these figures, the same symbols as FIGS. 3 and 4 represent the same or identical portions.

In FIGS. 10 and 11, frame 28 is cantilevered on the upper portion of supporting stay 9 provided in the rear of the body 2. Grass-bag 11 (11a, 11b) is supported by hooking the upper edge portion over the frame 28. Frame 28 is opened in the rear of the body so that grass-bag 11 can be fixed on and taken out from the rear of the body, or from the direction of arrow 29.

Fixed to frame 28 is frame board 31 for supporting the upper cylinder body 14 of shooter 13 for rotation in the direction of double arrow 30. Since the upper cylinder body 14 of shooter 13 is supported for rotation by frame board 31, it can easily be connected with or disconnected from intermediate cylinder body 15 (see FIG. 3) for maintenance. The discharge port of upper cylinder body 14 is cut away in an appropriate angle at its forward and downward portion so that grass is accumulated in grass-bag 11 as evenly as possible.

Cover 12, for covering the discharge port of the upper cylinder body 14 of shooter 13 and the opening of grass-bag 11, is supported for freely opening and closing movement in the direction of arrow 35 by supporting shaft 34 passing through bracket 32 fixed to the supporting stay 9 and member 33 fixed to cover 12 by appropriate fastening means such as bolt and nut. Reinforcing angle member 36 is attached to the bottom at the side opposite to the supporting shaft or close to the rear end of the body so that it presses the upper edge portion 11c of grass-bag 11 toward frame 28 when cover 12 is closed as shown in FIG. 10. In addition, cover 12 has an inner surface 37 which blocks the upper edge portion 11c at the rear side of the body to prevent movement of grass-bag 11.

Light sensor mounting member 38 is attached to the inside of cover 12. Light sensor mounting member 38 is made, for example, by shaping thin steel sheet so that its cross section is shaped in a shallow "U"-letter, to make it lightweight and ensure some degree of mechanical strength, and the overall shape forms a "U"-letter or an arc so as to cover the discharge port and its periphery of the upper cylinder body 14 of shooter 13. A light emitting portion 17a and light receiving portion 17b, constituting light sensor 17, are positioned opposite to each other so that their optical axes 17c are in coincidence, and they are firmly attached to both ends of light sensor mounting member 38. The mechanical strength of mounting member 38 is sufficient to maintain the relative positional relationship between the light emitting portion 17a and light receiving portion 17b.

Light sensor mounting member 38 is fixed to cover 12 by two mounting means. One of them is a mounting board 39 screwed at one end to cover 12 at the front side of the body and welded at its other end to the middle of light sensor mounting member 38, and the other mounting means is a wire-like mounting member 40, acting as a kind of buffer spring, that is screwed at one end to the reinforcing angle member 36 and attached for rotation at its other end to an end of light sensor mounting member 38 by fitting member 45. Mounting board 39 has relatively high rigidity, and light sensor mounting member 38 is mainly supported by the mounting board 39 at a predetermined position in the neighborhood of the discharge port of upper cylinder body 14. The wire-like mounting member 40 has a spring action and facilitates the supporting of light sensor mounting member 38.

The lead cables 41 and 42 drawn out from the light emitting portion 17a and light receiving portion 17b, respectively, are bundled into a cable 43 which is then drawn out to the outside of cover 12 through bush 44 and connected to a controller, not shown.

The bush 44 is desirably positioned as close as possible to the supporting shaft 34 of cover 12. Since such arrangement can prevent an excessive pulling force from acting on cable 43 when cover 12 is opened or closed around supporting shaft 34, cable 43 is easily handled and it is unnecessary to lengthen cable 43 and slacken it beforehand.

Metallic mesh 46 is provided along the inside of cover 12 to prevent mown grass from sticking on an inner surface of cover 12. One end of mesh 46 is fixed to the ceiling portion of cover 12 by pin 47, and the other end is fixed to reinforcing angle member 36 along with the wire-like mounting member 40.

FIG. 12 is a perspective view showing a state in which the cover 12 is opened. In this state, since cover 12 and light sensor 17 can both be kept away from above grass-bag 11 (11a, 11b), the disposal work of the grass accumulated in grass-bag 11 is easy and the handling of shooter 13 for maintenance is also easy.

Since the light sensor mounting member 38 is mechanically strong enough, relatively firmly supported at one point with respect to cover 12 and resiliently attached at another point by the wire-like mounting member 40, it can resiliently accommodate an external shock even if cover 12 is made of a lightweight material having relatively small rigidity such as reinforced plastic. Accordingly, some extent of deformation of cover 12 due to the shock does not cause optical axis 17c to deviate.

Although the foregoing embodiments of the invention utilize a light sensor that consists of a light emitting portion 17a and a light receiving portion 17b respectively placed at both ends of light sensor mounting member 38, the present invention is not limited to this arrangement. A similar effect may also be obtained by disposing an integrated light sensor comprising both the light emitting and receiving portions at one end of light sensor mounting member 38, and mounting, at the other end of light sensor mounting member 38, a reflecting board for reflecting the light beam emitted from the light emitting portion in the direction of incidence, or a retroreflective board.

Incidentally, the light sensor in which the light emitting and receiving portions are integrated and the retroreflective board need not always be indirectly fixed to cover 12 using light sensor mounting member 38, but it may be directly attached to cover 12, because it is easy to irradiate the retroreflective board with light from the light emitting portion by making the retroreflective board larger in size, and when the retroreflective board can be irradiated with light, the reflected light can be correctly received by the integrated light receiving portion.

Figure 13:
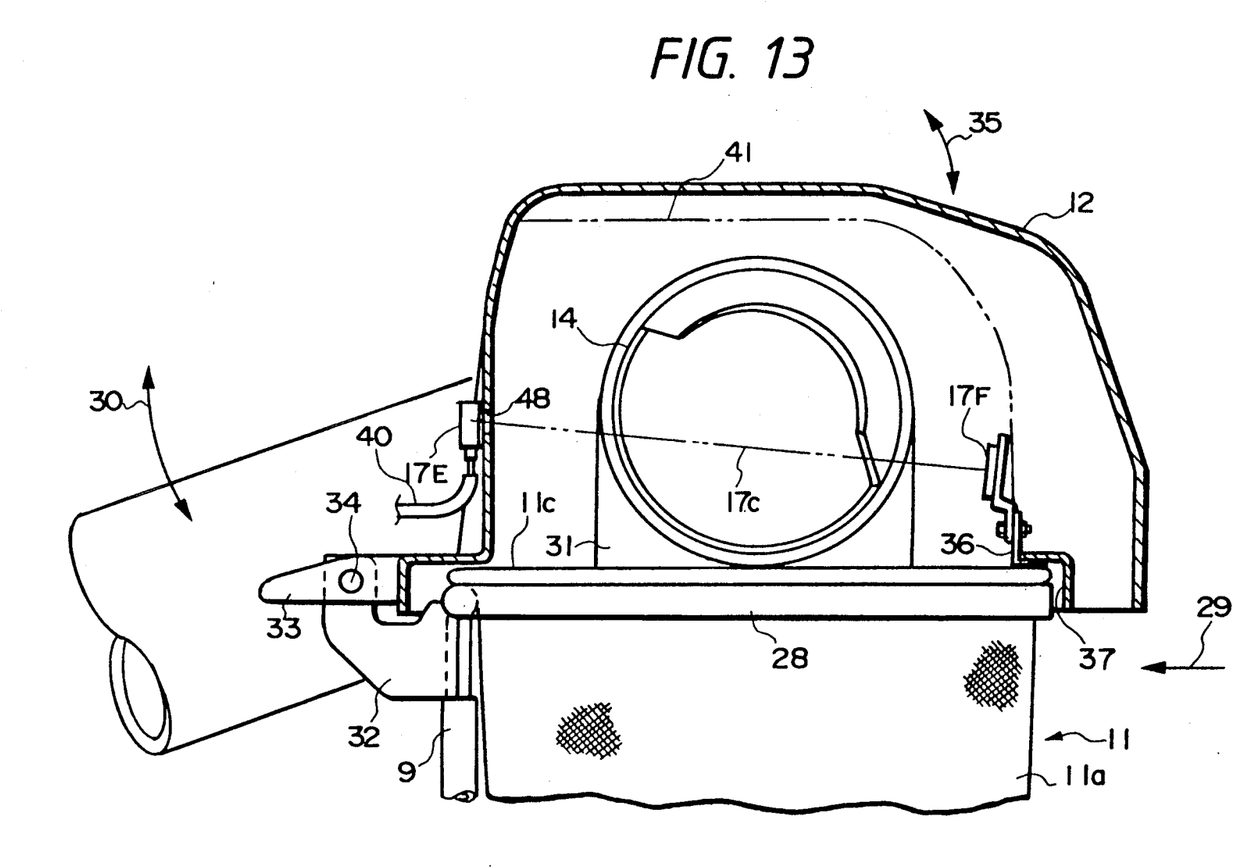
FIG. 13 is a sectional view of another modification of the main part of the grass-bag.

FIG. 13 shows a further example in which integrated light emitting/receiving-portions and a retroreflective board are respectively disposed on opposite sides of the cover so that the optical axis of the light emitting-/receiving portions is directed to the retroreflective board.

A light sensor for detecting the amount of accumulated grass is attached to the outer surface of cover 12. The light sensor consists of a light sensor main body 17E which has integrally built-in light emitting and receiving portions. Body 17E is placed at one side of cover 12, and a retroreflective board 17F is placed at the side of the cover 12 opposite to the light sensor main body 17E for reflecting the incident light from the light emitting portion in the direction of incidence. Hole 48 is bored in the portion of cover 12 which is opposed to the light beam input/output surface of the light sensor main body 17E, for allowing the light beam emitted from light sensor main body 17E to be applied to retroreflective board 17F on the inside of cover 12. The retroreflective board 17F is fixed to the reinforcing angle member 36. Since the retroreflective board 17F reflects light in the direction of incidence, there is virtually no deviation of the light reflected by retroreflective board 17F from the light receiving portion even if cover 12 is made of a lightweight material having relatively small rigidity such as reinforced plastic, and even if it is deformed a little by an external shock the light beam emitted from the light emitting portion is reflected by retroreflective board 39 and detected by the light receiving portion. The optical axis 17c connecting light sensor main body 17E and retroreflective board 17F is positioned across the vicinity of the discharge port of shooter 13.

Although the embodiment described above applies the present invention to the manned type mower, the present invention is not limited to that and can similarly be implemented in a driverless or manual mower.

As obvious from the above description, in accordance with the present invention, the jamming of the shooter exit due to excessive accumulation of grass is eliminated, whereby the requirement of time and labor for removing the grass within the shooter and cleaning thereof can be avoided. In addition, since too early detection of fullness of the grass-bag is eliminated and the number of times of disposals of the grass accumulated in the grass-bag can be decreased, the work can be done efficiently.

What is claimed is:

1. An apparatus for detecting grass-bag fullness of a mower wherein cut grass is conveyed within a shooter by an air flow fed into the shooter, and received in a grass-bag, said apparatus comprising:
    a transmission type light sensor disposed at a predetermined position in the vicinity of a discharge port of said shooter, said discharge port being located above the grass-bag, said transmission type sensor comprising a light emitting portion and a light receiving portion which are mounted respectively on a pair of projections adjacent a peripheral wall of the discharge port of said shooter, a light emitting surface of the light emitting portion and a light receiving surface of the light receiving portion being opposed to each other,
    signal continuity detection means for detecting when a light blocking state of said transmission type light sensor has continued longer than a predetermined time and operative to generate a detection signal in response to said detection,
    alarm means responsive to said detection signal for giving an alarm that said grass-bag is full, and
    means for resetting said signal continuity detection means to an initial state when said light blocking state is interrupted within said predetermined time.

2. An apparatus as set forth in claim 1 further comprising a rotary blade placed in the vicinity of the entrance of said shooter for cutting grass and feeding cut grass as well as an air flow generated thereby into said shooter.

3. An apparatus as set forth in claim 1 wherein said signal continuity detection means includes a time constant circuit comprising a resistor and a capacitor, and having the output of said light sensor as an input thereto, said signal continuity detection means being reset by discharging the capacitor.

4. An apparatus as set forth in claim 1 wherein said signal continuity detection means is operative to determine that said light blocking state has continued longer than the predetermined time when the total sum of the times that light is blocked from said light recessing portion during a predetermined calculation time period is greater than a predetermined percentage of said calculation time period.

5. An apparatus as set forth in claim 1 wherein the light emitting and receiving portions are so placed that an optical axis connecting said portion is substantially horizontal.

6. An apparatus as set forth in claim 1 wherein at least one of the light emitting and receiving portions is placed in a recess formed by a bracket placed outside a window in a wall portion on which the bracket is mounted so that the light path from the light emitting portion to the light receiving portion passes through said window.

7. An apparatus as set forth in claim 6 wherein said window is covered by a light-transparent material.

8. An apparatus for detecting grass-bag fullness of a mower wherein cut grass is conveyed within a shooter by an air flow fed into the shooter, and received in a grass-bag, said apparatus comprising:

a transmission type light sensor comprising a light emitting portion and a light receiving portion disposed at a predetermined position in the vicinity of a discharge port of said shooter, said discharge port being located above the grass-bag, a cover above the grass-bag for covering the grass-bag and the discharge port of the shooter, a substantially arc-shaped sensor mounting member attached to the inside of said cover so as to span the vicinity of the discharge port of said shooter when said cover is closed, the light emitting and receiving portions of said sensor being so fixed to said sensor mounting member that optical axes of light emitting and receiving surfaces of said portions are in coincidence with one another, signal continuity detection means for detecting that a light blocking state of said transmission type light sensor has continued longer than a predetermined time and for generating a signal in response to said detection, alarm means responsive to said detection signal for giving an alarm that said grass-bag is full, and means for resetting said signal continuity detection means to an initial state when said light blocking state is interrupted within said predetermined time.

9. An apparatus as set forth in claim 8, wherein said sensor mounting member and mounting board have enough mechanical strength to maintain the relative positional relationship between the light emitting and receiving portions of said transmission type sensor.

10. An apparatus as set forth in claim 9 wherein said sensor mounting member is held in a predetermined position by a mounting board which is fixed at one end to one side of said cover and fixed at another end to an intermediate portion of said sensor mounting member, an end of said sensor mounting member being further attached to the other side of said cover through a resilient member, and the light emitting and receiving portions of said sensor being respectively attached to opposite ends of said sensor mounting member.

11. An apparatus for detecting grass-bag fullness of a mower wherein cut grass is conveyed within a shooter by an air flow fed into the shooter, and received in a grass-bag, said apparatus comprising:

a transmission type light sensor disposed at a predetermined position in the vicinity of a discharge port of said shooter, said discharge port being located above the grass-bag, said sensor comprising a light emitting portion and a light receiving portion that are integrated with one another in a unit, and a retroreflective board, said unit and said retroreflective board being respectively attached to a pair of projections adjacent a peripheral wall of the discharge port so that light emitted from said light emitting portion is reflected by said retroreflective board to be incident upon said light receiving portion, signal continuity detection means for detecting that a light blocking state of said transmission type light sensor has continued longer than a predetermined time and for generating a detection signal in response to said detection, alarm means responsive to said detection signal for giving an alarm that said grass-bag is full, and means for resetting said signal continuity detection means to an initial state when said light blocking state is interrupted within said predetermined time.

12. An apparatus for detecting grass-bag fullness of a mower wherein cut grass is conveyed within a shooter by an air flow fed into the shooter, and received in a grass-bag, said apparatus comprising:

a transmission type light sensor comprising a light emitting portion and a light receiving portion integrated with one another into a unit that is disposed at a predetermined position in the vicinity of a discharge port of said shooter, said discharge port being located above the grass-bag, a cover for covering the grass-bag and the discharge port of the shooter, said transmission type sensor also comprising a retroreflective board, said unit and retroreflective board being so attached to the inside of said cover that light emitted from the light emitting portion of said unit is reflected by said retroreflective board and is incident upon the light receiving portion of said unit, signal continuity detection means for detecting that a light blocking state of said transmission type light sensor has continued longer than a predetermined time and for generating a detection signal in response to said detection, alarm means responsive to said detection signal for giving an alarm that said grass-bag is full, and means for resetting said signal continuity detection means to an initial state when said light blocking state is interrupted within said predetermined time.

13. An apparatus as set forth in claim 12 including a substantially arc-shaped sensor mounting member attached to the inside of said cover so as to span the vicinity of the discharge port of said shooter when the cover is closed, said unit being fixed to said sensor mounting member.

* * * * *